UNITED STATES PATENT OFFICE.

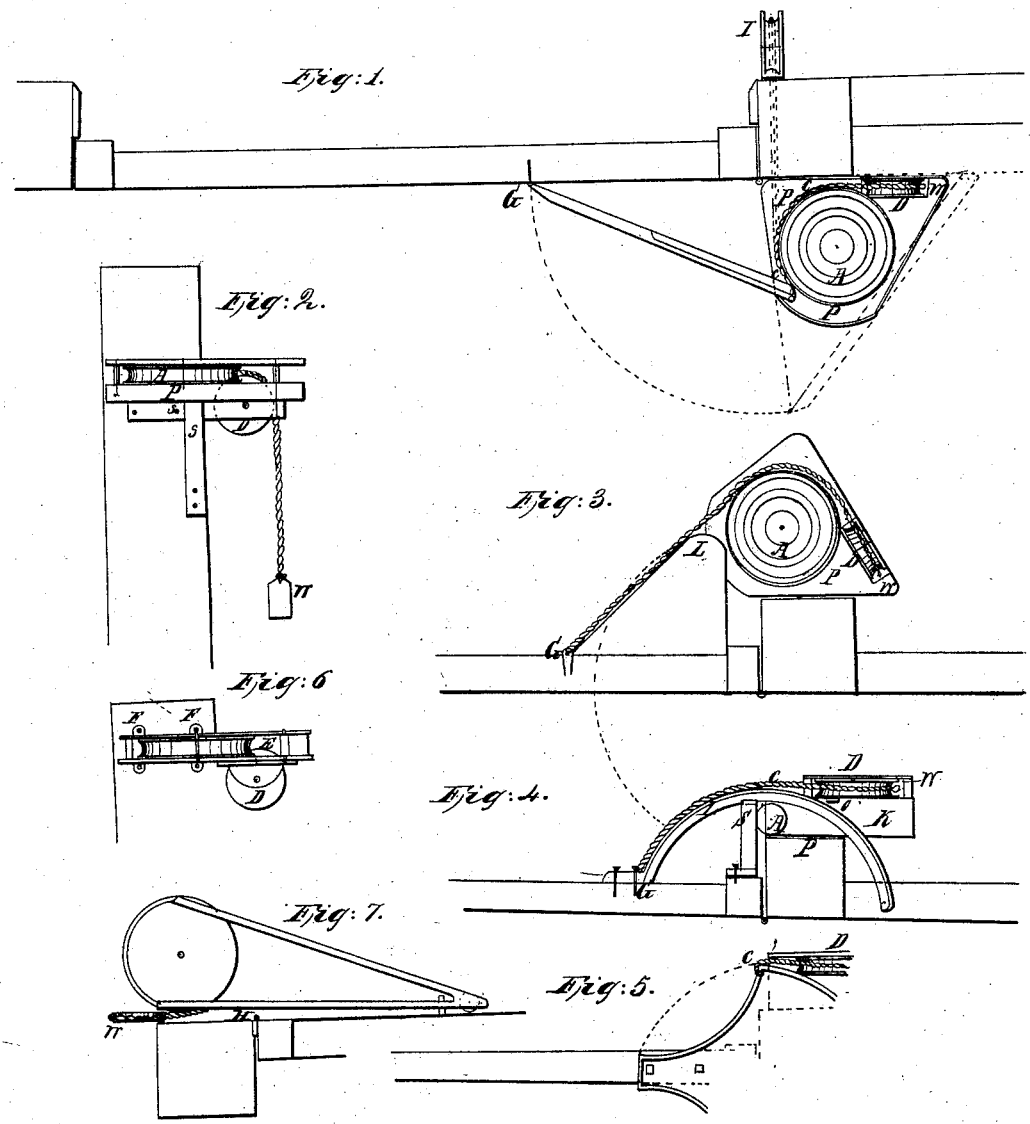

THOMAS B. HAND, OF MADISON, INDIANA.

IMPROVED MODE OF CLOSING FARM-GATES.

Specification forming part of Letters Patent No. 18,449, dated October 20, 1857

*To all whom it may concern:*

Be it known that I, THOMAS B. HAND, of Madison, in the county of Jefferson and State of Indiana, have invented a new, simple, neat, and effectual Machine for Shutting Gates and for other Purposes, of which the following is a full description.

The nature of my invention consists in providing a neat, simple, compact and out-of-the-way machine to be attached to the hinge-post of a gate or other object, which will give an even, regular, and permanent force to the swing of the same, and the power of which can be regulated at pleasure.

I construct a platform or a case (P in Figure 1 in the accompanying drawings) on or in which is placed a horizontal grooved pulley-wheel, as shown at A, around which and over a vertical wheel D works a cord or chain c, with a weight attached to one end w. The other end of the cord or chain is fastened to one end of a grooved brace B, the other end of the brace being attached by hinge or staple, as at g, to the gate or other object, the brace to be made of a length and fastened to the gate at a point that will make the back end of the brace touch the fence (or a guard fixed for that purpose) just so as to keep the gate from striking the machine.

Fig. 2 is an upright view showing the position of the vertical wheel, weight, &c. The peculiar advantages of this contrivance are, first, the equality of force applied when the gate is open and when it is at the closing-point, also its infallibility; second, its adaptedness to a front gate opening inside; third, it is out of the way, there is no post standing out from the fence, and no chain and heavy weight annoying the passer-through, as in the ordinary methods; fourth, it does not wreck the gate and fence like the old method, and, fifth, when properly secured it is not liable to get out of order.

Fig. 3 of the drawings shows the mode of applying the machine (in the same form but with a lever instead of the brace) to the inside of a front gate opening outside. The other side of the machine (from that shown in Fig. 1) is made fast to the post, and the cord or chain, instead of being fastened to the brace, passes around a triangular or curved grooved lever, as shown at L, and is fastened to the gate at g.

Fig. 4 shows another mode of applying the same principle to accomplish the same end, L being a curved grooved lever attached to the gate at g and resting upon and attached to a support at S. The cord or chain C is attached to the lever or gate at g and passes around the lever and over the vertical wheel D, which is attached to a block K, the block being fastened to the post at P. A small horizontal wheel A may be placed upon the block behind the lever or an upright guide at o to prevent the cord or chain from getting too much out of line of the vertical wheel should the gate be thrown too far round.

It is also contemplated (where circumstances will admit of it) to construct the curved lever as shown in Fig. 5, and apply it to the top of the fence, being made fast to the gate with the center over the hinge H, the chain fastened at c and working over the vertical wheel D with the weight W. In this mode the action is perfect.

Fig. 6 is a side representation of the machine made wholly of iron, being a case E, the upper and lower sides of which S S being the same size of the platform P in Fig. 1, and with flanges F for screw-fastenings, the vertical wheel D in a separate case to be riveted to either side of the principal case, where apertures are left for the purpose.

The machine is so constructed (the platform and case being both sides alike) that it may be put together for either a right-hand or a left-hand gate, door, or other object.

I in Fig. 1 shows the position in which the vertical wheel may be placed should it be desirable to apply the machine with the brace to the outside of an outside gate, carrying the cord or chain through the post or fence and having the weight inside.

Fig. 7 shows yet another mode of applying the same combination of principles to accomplish the same objects, acting somewhat similar to the ordinary spring, with the advantage of the force being permanent and in amount to be regulated at pleasure. In this form it can be more advantageously applied to the top of a door, (the door swinging under it,) placing the center V opposite the perpendicular line of the hinge H and having a projecting plate or a wheel for the end of the lever to play upon, thus allowing the door to swing all the way round.

What I claim as my invention, and desire to secure by Letters Patent, is—

The application of the semi-grooved tangent brace or lever with pulleys and weighted cord for the closing of farm-gates and other similar purposes, as in the several modes specified, and in such a manner as to secure a great equality and permanency of force and the amount of which can be regulated at pleasure, and using any material that will answer the purpose.

THOS. B. HAND.

Witnesses:
   JOSEPH NORTHCROFT,
   F. POGUE.